(12) United States Patent
Saecker

(10) Patent No.: US 11,480,476 B2
(45) Date of Patent: Oct. 25, 2022

(54) THERMOMETER WITH IMPROVED RESPONSE TIME

(71) Applicant: Endress+Hauser Wetzer GmbH+Co. KG, Nesselwang (DE)

(72) Inventor: Dietmar Saecker, Füssen (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 392 days.

(21) Appl. No.: 16/624,380

(22) PCT Filed: May 9, 2018

(86) PCT No.: PCT/EP2018/062055
§ 371 (c)(1),
(2) Date: Dec. 19, 2019

(87) PCT Pub. No.: WO2018/233925
PCT Pub. Date: Dec. 27, 2018

(65) Prior Publication Data
US 2020/0132556 A1 Apr. 30, 2020

(30) Foreign Application Priority Data
Jun. 21, 2017 (DE) .................... 10 2017 113 768.8

(51) Int. Cl.
*G01K 7/02* (2021.01)
*G01K 1/08* (2021.01)
(Continued)

(52) U.S. Cl.
CPC ................. *G01K 7/02* (2013.01); *G01K 1/08* (2013.01); *G01K 1/18* (2013.01); *G01K 7/16* (2013.01);
(Continued)

(58) Field of Classification Search
CPC .......... H01C 1/02; H01C 7/008; H01C 17/00; G01K 7/02; G01K 1/08; G01K 1/18; G01K 7/16
See application file for complete search history.

(56) References Cited

U.S. PATENT DOCUMENTS 2,780,703 A * 2/1957 MacIntyre ............... G01K 7/18
338/274
3,699,200 A * 10/1972 Tokarz ................... G01K 13/02
264/102
(Continued)

FOREIGN PATENT DOCUMENTS

CN 1251423 A 4/2000
CN 101173873 A 5/2008
(Continued)

OTHER PUBLICATIONS

JPS5670436, Abe, machine translation. (Year: 1981).*
(Continued)

*Primary Examiner* — Kyung S Lee
(74) *Attorney, Agent, or Firm* — Mark A. Logan; Endress+Hauser (USA) Holding Inc.

(57) ABSTRACT

The present disclosure relates to a method for manufacturing an apparatus for determining and/or monitoring temperature of a medium comprising method steps as follows: arranging a sensor element in a sensor head, producing a vacuum in an internal volume of the sensor head, introducing at least one fill material into at least a portion of the internal volume of the sensor head, and closing the sensor head. The present invention relates, moreover, to a correspondingly manufactured apparatus.

11 Claims, 3 Drawing Sheets

(51) Int. Cl.
*G01K 1/18* (2006.01)
*G01K 7/16* (2006.01)
*H01C 1/02* (2006.01)
*H01C 7/00* (2006.01)
*H01C 17/00* (2006.01)

(52) U.S. Cl.
CPC .............. *H01C 1/02* (2013.01); *H01C 7/008* (2013.01); *H01C 17/00* (2013.01)

(56) References Cited

U.S. PATENT DOCUMENTS

| | | | | |
|---|---|---|---|---|
| 4,597,675 | A | * | 7/1986 | Maertins ................ G01K 13/02 702/50 |
| 6,102,565 | A | * | 8/2000 | Kita ....................... G01K 1/125 374/E1.017 |
| 6,341,892 | B1 | * | 1/2002 | Schmermund ........... G01K 1/08 374/185 |
| 2010/0074299 | A1 | * | 3/2010 | Nyffenegger ............ G01K 7/16 374/185 |
| 2015/0211942 | A1 | * | 7/2015 | Saraie .................. G01K 13/006 374/185 |

FOREIGN PATENT DOCUMENTS

| | | | |
|---|---|---|---|
| CN | 102313611 | A | 1/2012 |
| CN | 103604526 | A | 2/2014 |
| CN | 204373810 | U | 6/2015 |
| DE | 10322166 | A1 | 5/2004 |
| DE | 102007031028 | A1 | 1/2009 |
| DE | 112015001343 | T5 | 12/2016 |
| JP | 5670436 | A | 6/1981 |
| JP | 56070436 | A | 6/1981 |
| JP | 6150971 | B1 * | 6/2017 ............ G01K 1/08 |
| WO | 2011102810 | A1 | 8/2011 |

OTHER PUBLICATIONS

WO2009003616 (same as DE 102007031028), Eichler, machine translation. (Year: 2009).*
JP6150971, Yamana, machine translatioin. (Year: 2017).*
Kempf, Wolfgang, Itasse, Stéphane, Prozessdruck, Befüllanlage für feine Membrane und kleine Drucksensoren, Jul. 3, 2012, www.maschinenmarkt.vogel.de/index/crm?pdi=5112&pk=369., (last accessed Feb. 2, 2018), 3 pp.

* cited by examiner

THERMOMETER WITH IMPROVED RESPONSE TIME

CROSS-REFERENCE TO RELATED APPLICATIONS

The present application is related to and claims the priority benefit of German Patent Application No. 10 2017 113 768.8, filed on Jun. 21, 2017 and International Patent Application No. PCT/EP2018/062055 filed on May 9, 2018, the entire contents of which are incorporated herein by reference.

TECHNICAL FIELD

The present invention relates to a method for manufacturing an apparatus for determining and/or monitoring temperature of a medium, as well as to a corresponding apparatus.

BACKGROUND

Thermometers are known from the state of the art in the most varied of embodiments. Thus, there are thermometers, which for measuring temperature use the expansion of a liquid, a gas or a solid with known coefficient of expansion, or even such, which relate the electrical conductivity of a material to the temperature, such as, for example, in the case of application of resistance elements or thermocouples. In contrast, in the case of radiation thermometers, especially pyrometers, the heat radiation of a substance is utilized for determining its temperature. The various underpinning measuring principles have already been described in a large number of publications.

In the case of a temperature sensor in the form of a so-called thin film sensor, especially a Resistance Temperature Detector (RTD), a sensor element equipped with connection wires and mounted on a substrate is used, for example, wherein the rear side of the support substrate is, as a rule, coated with metal. Used as sensor elements, in such case, are so-called resistance elements, for example, in the form of platinum elements, which, among others, are obtainable commercially under the labels, PT10, PT100, and PT1000.

The resistance elements are frequently installed by means of a soldering method within a sensor head, for example, a sensor tip, and especially on the inner floor of a sleeve of, e.g., stainless steel. Corresponding thermometers are manufactured and sold by the applicant, for example, under the mark, Quicksens.

Performed as soldering method in many cases is a so-called SMD soldering, in the case of which, firstly, a solder is mounted on a first component and then a second component superimposed and, by heating, soldered to the first component. For the example of a sensor head of a resistance thermometer, usually, firstly, a defined amount of solder in the solid state (e.g in the form of a small disk of solder) is placed in the sensor head and by subsequent heating melted on the inner floor of the sensor head. The sensor element is then immersed in the solder with its metallized face and, in this way, soldered to the inside of the sensor head. Methods for the manufacture of such a soldered connection for a thermometer are known, for example, from the patent disclosures DE102006048448A1 and DE102015112199A1. Fundamentally in the case of a corresponding resistance thermometer, the soldered connection has a large influence on the thermal properties of the thermometer, especially the thermal coupling between resistance element and sensor head.

Alternatively to thermometers, in the case of which the resistance element is soldered to the sensor head, there are numerous thermometers, in the case of which the temperature sensors are embedded and/or encapsulated, especially in ceramic powders, such as, for example, magnesium oxide (MgO) or aluminum oxide ($Al_2O_3$), or in a ceramic potting material, especially a curing ceramic potting material. Also such thermometers are manufactured and sold by the applicant, for example, under the mark, Strongsens. The encapsulations or potting serves for securing the temperature sensors. Moreover, for example, the connection lines of the temperature sensor are insulated from one another and from the housing of the sensor head, especially a sensor tip, even at high temperatures, especially at temperatures, for instance, up to 600° C. A method for manufacturing a thermometer embodied in such a manner is known, for example, from patent disclosure DE02329239A1. In order to cast the temperature sensor, predeterminable amounts of first and second components of a potting material are introduced into a mold, especially a mold in the form of a sensor tip. Then, the sensor tip is shaken and/or caused to oscillate with a predeterminable frequency.

Advantageously, resistance thermometers, whose temperature sensor is soldered to the sensor head, have especially good response times for reacting to a change of the temperature of a medium. Corresponding thermometers are, however, disadvantageously not suitable for measuring high temperatures, especially temperatures T>200° C. Also such thermometers have, in comparison with thermometers, in the case of which the temperature sensor is embedded and/or encapsulated, a significantly lesser mechanical stability. Thermometers with embedded and/or encapsulated temperature sensors have, however, disadvantageously worse response times in comparison with thermometers with soldered temperature sensors.

SUMMARY

Based on the above, an object of the present invention is to improve the response times of thermometers with embedded and/or encapsulated temperature sensors.

This object is achieved by the method as defined in claim 1 as well as by the apparatus as defined in claim 14. Advantageous embodiments appear in the dependent claims.

Regarding the method, the object is achieved by a method for manufacturing an apparatus for determining and/or monitoring temperature of a medium, wherein the method comprises steps as follows:

arranging a sensor element in a sensor head,
producing a vacuum in an internal volume of the sensor head,
introducing at least one fill material into at least a portion of the internal volume of the sensor head, and
closing the sensor head.

The method described in patent disclosure DE02329239A1, for example, can be applied for introducing the fill material. However, also other methods familiar to those skilled in the art are possible for the introduction of a fill material into a sensor head and fall within the scope of the present invention.

The heat conduction within the sensor head, especially the heat conduction from the wall of the sensor head to the temperature sensor, depends decisively on the density of the fill material within the sensor head—there is, thus, a relationship between the thermal conductivity of fill material and its arrangement within the sensor head, especially relative to the achievable density of the fill material. Since at least the internal volume of the sensor head is vacuumized before the introduction of the fill material, an increased density of the filling can be achieved, which, in turn, leads advantageously to a significantly improved response time of the thermometer to a temperature change of the medium.

In an advantageous embodiment of the method, the sensor element is a temperature sensor, comprising a temperature sensitive element and at least one connection wire for contacting, especially electrically contacting, the element. For example, the temperature sensitive element can be a resistance element, especially a platinum element.

Another advantageous embodiment provides that a vacuum with a pressure of less than $10^{-1}$ mbar, preferably less than $10^{-2}$ mbar, and especially preferably less than $10^{-3}$ mbar is produced.

Especially advantageous is when the at least one fill material is a powdered material. A powdered material can be filled especially easily into a sensor head, which, as a rule, is embodied in the form of a cylindrical sleeve. Because of the use of a powder, it can especially be assured that essentially all intermediate spaces between the inner walls of the sensor head and the sensor element arranged at least partially within the sensor head are filled with fill material. The powdered fill material is frequently further compacted within the sensor head after its filling into the same. For this, various methods familiar to those skilled in the art are possible, which all fall within the scope of the present invention.

In an embodiment of the method, the at least one fill material is an aluminum oxide, a magnesium oxide, an, especially curing, ceramic potting material, carbon nanotubes, boron nitride, aluminum nitride, silicon carbide, or metal, especially aluminum, copper or silver. Common to all these materials is that their thermal conductivities depend on, among other things, their density, or their solids content.

Another embodiment includes that at least first and second fill materials are charged into the sensor head.

Involved in such case can be, for example, a two component potting material. In this regard, advantageously the first and second fill materials are introduced in the form of a mixture into the sensor head. Likewise an option, however, is that the first and second fill materials are charged sequentially into the sensor head. In such case, especially also a first portion of the internal volume can be filled with the first fill material and a second portion of the internal volume with the second fill material.

Regarding the latter embodiments, reference is made especially to the previously unpublished German patent application No. 102016125403.7 and the embodiments described therein. Such application relates to a thermometer, in the case of which a sensor head is filled with at least two different materials, wherein the first material serves for fixing at least one component of the sensor element and the second material for heat conduction within the sensor head. Comprehensive reference is taken to this application in the context of the present invention.

Another preferred embodiment of the method provides that the sensor head is shaken and/or caused to oscillate with a predeterminable frequency. This can be done during the charging of the at least one fill material and also following the filling. This embodiment assures, on the one hand, a homogeneous filling of the internal volume of the sensor head to be filled. Moreover, in the case of multiple fill materials, for example, a homogeneous mixture of the different fill materials can be produced, in case these are to be introduced in the form a mixture into the sensor head.

In an embodiment of the method, a gas is filled into the sensor head after the introduction of the fill material. Preferably, the gas is one with a thermal conductivity >0.05 W/(mK), for example, helium. In reference to this embodiment, it is, moreover, advantageous that the gas be filled into the sensor head with a pressure of at least 5 bar, preferably with a pressure of at least 10 bar. Because of the additional filling with an appropriate gas, the response time of the thermometer can be still further improved.

The object is, moreover, achieved by an apparatus for determining and/or monitoring a process variable of a medium, comprising a sensor element arranged in a sensor head and manufactured according to one of the above described methods.

In an embodiment of the apparatus, the sensor head comprises a sleeve element, especially a cylindrical sleeve element, and a floor element, especially a circular floor element.

The embodiments described in connection with the method of the invention are applicable mutatis mutandis also for the apparatus of the invention and vice versa.

BRIEF DESCRIPTION OF THE DRAWINGS

The invention will now be explained more exactly based on the appended drawing, the figures of which show as follows.

DETAILED DESCRIPTION

Figure 1:
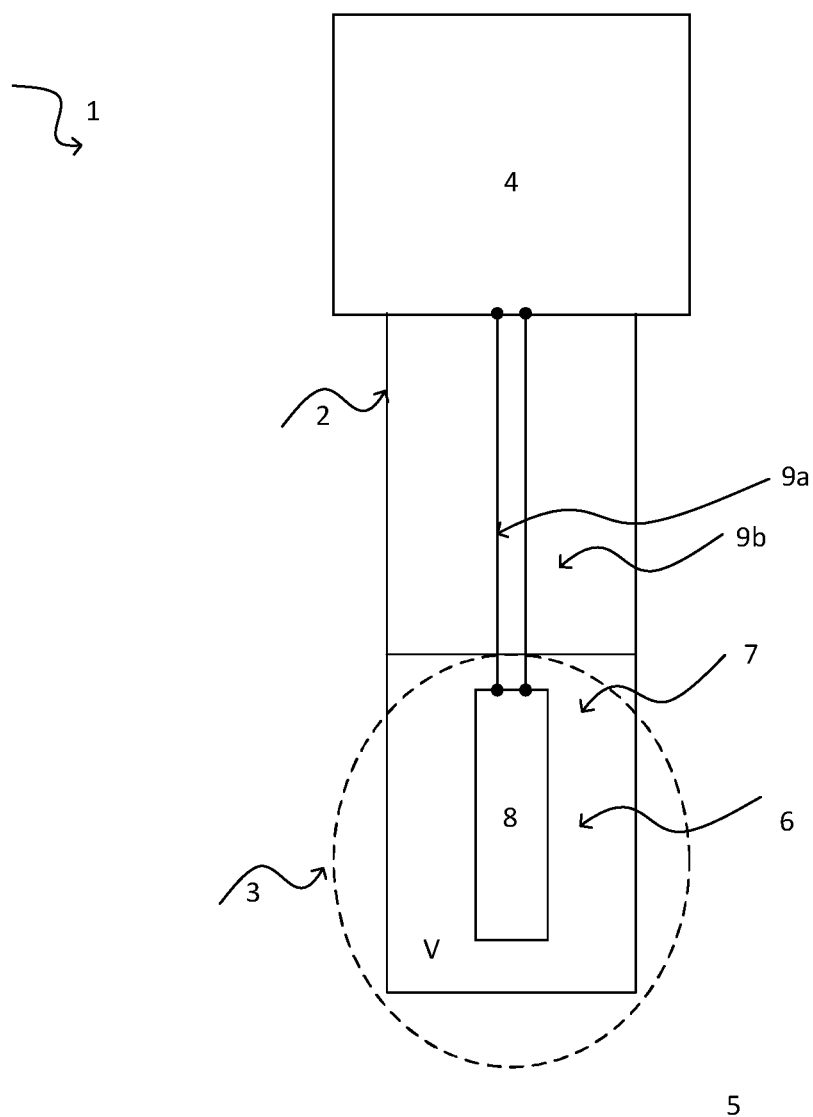
FIG. 1 shows a schematic drawing of a thermometer with encapsulated sensor element according to the state of the art.

In the following, equal elements are with provided with equal reference characters.

Shown in FIG. 1 is a schematic illustration of a thermometer 1 with a protective tube 2 and an electronics unit 4 according to the state of the art. The portion of the protective tube 2 facing the medium 5 is also referred to as the sensor head 3. An internal volume V of the sensor head 3 is filled with a fill material 6. Furthermore, there is arranged in the internal volume V of the sensor head 3 a temperature sensor 7, which in the illustrated embodiment comprises a temperature sensitive element 8, here in the form of a resistance element, and two connection wires 9a, 9b for electrical connection with the electronics unit 5. The temperature sensitive element 8 as well as a subsection of the connection wires 9a, 9b of the temperature sensor 7 are embedded and/or encapsulated by the fill material 6 within the internal volume V of the sensor head 3. This leads to an especially high mechanical stability and vibration resistance of the thermometer 1. However, the generally known materials suitable for assuring a high mechanical stability and vibration resistance are disadvantageously distinguished by comparatively low thermal conductivities λ. Thus, thermometers 1, in the case of which at least one component of the temperature sensor 7, in this case, the sensor element 7 and a subsection of the connection wires 9a, 9b, is embedded in a filler 6 or encapsulated within the fill material 6, have comparatively worse response times.

The fill material 6 is, for example, an aluminum oxide, a magnesium oxide, an, especially curing, ceramic potting material, carbon nanotubes, boron nitride, aluminum nitride, silicon carbide, or metal, especially aluminum, copper or silver.

In the case, in which the fill material 6 is electrically conductive, different measures are possible for preventing an electrical short circuit between at least one component 8, 9 of the temperature sensor 7 and the sensor head 3, which is usually manufactured of a metal. The connection wires 8, 9 can be surrounded over a suitable length by an electrical insulation (not shown). In the region of the contacting, an electrically insulating formed part (not shown) can be used between the connection wires 9a, 9b. Regarding this topic, known to those skilled in the art are many other options, which all fall within the scope of the present invention.

Now it is, however, desirable that in the case of a thermometer basically besides a high mechanical stability achievable by the potting, or encapsulation, of the sensor element also an as high as possible thermal conductivity $\lambda$ be possessed by the fill material 6. The two goals are, however, as a rule, not directly compatible. This problem is overcome by the present invention by vacuumizing an internal volume V of the sensor head 3, before the fill material 6 is charged. By producing a vacuum, an increased density of the fill material 6 can be achieved. This leads to significantly improved response times of the respective thermometer.

Without intending to limit the general applicability of the invention, the following description concerns a fill material 6 in the form of a powder. Such powdered materials are especially frequently applied for encapsulation of sensor elements 3 in the case of thermometers 1. A powder is especially advantageous, because it is especially easy to charge such into the sensor head 3. Moreover, by the use of a powder, it can be assured that the internal volume V of the sensor head 3 is filled homogeneously with the fill material 6. Analogous considerations can hold for other states of a fill material, as well as for granular material or the like.

Figure 2:
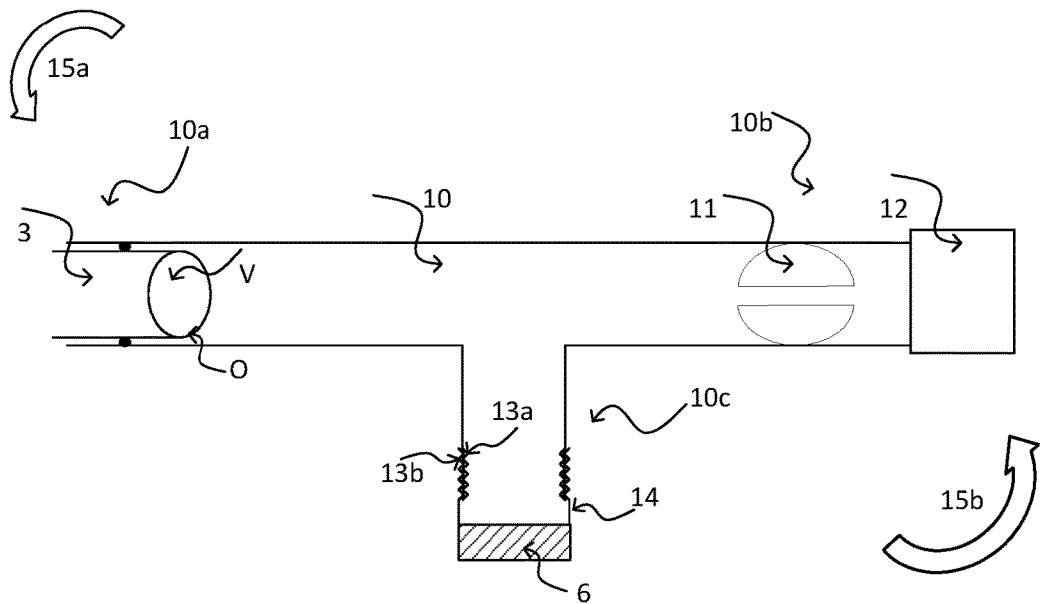
FIG. 2 shows a schematic drawing of the steps of a method of the present disclosure.

FIG. 2 shows a preferred embodiment for manufacturing a resistance thermometer 1 according to the invention. After the arrangement of the sensor element 3, which for the present case is a resistance element of FIG. 1, a vacuum is produced within an internal volume V of the sensor head 3 in a first step. For this, an apparatus 10 in the form of a T-shaped tube can be used, in which in a first end region 10a via a valve 11 a vacuum pump 12 can be introduced and in a second end region 10b the sensor head 3. Sensor head 3 includes a cylindrical sleeve element, which is not closed in the region facing the T-shaped tubular piece 10, but, instead, is vacuumizable via the opening O. Sensor head 3 can, in such case, be secured within the T-shaped tube piece 10 by means of a suitable seal, for example, in the form of an O-ring. An opening of the T-shaped tube piece 10 in a third end region includes, finally, a screw thread 13a, on which a cap 14 with a corresponding complementary screw thread 13b can be screwed. The at least one fill material 6 is located within the cap 14.

It is to be noted here that use of the apparatus 10 is not the only way of executing a method of the invention. Rather, numerous other variants are available, by means of which the sensor head 3 can likewise be vacuumized and which are well known to those skilled in the art. Moreover, it is understood that the apparatus 10 can be changed as much as desired, when, for example, the fill material 6 is composed of a plurality of components. Such can, for example, be introduced in separate caps 14, etc.

For manufacture of a thermometer 1 of the invention, the internal volume V of the sensor head 3 is vacuumized in a first step via the tubular piece 10. Preferably, in such case, a vacuum with a pressure of less than $10^{-1}$ mbar is produced. Then, the cap 14 can be optionally heated for a predeterminable time interval, in order to remove possible impurities within the powder 6. The impurities concern, for example, various gas molecules bound on the powder 6. The temperature, to which the cap 14 with the powder 6 is heated, should, in such case, preferably be less than a melting- or sintering temperature of the powder 6, especially less than an evaporation temperature of the powder 6.

In a second step, the apparatus 10 can, for example, be rotated corresponding to the direction of rotation indicated by the arrows 15a, 15b, in order that the powder 6 can be filled from the cap 14 into the sensor head 3. During this method step or following thereon, the sensor head 3 within the apparatus 10 can optionally be supplementally shaken and/or caused to oscillate with a predeterminable frequency.

In a last method step (not shown), the sensor head 3 is closed. Such can occur, for example, by a welding a floor plate (not shown) to close the opening O, after the sensor head 3 is removed from the apparatus 10.

Figure 3:
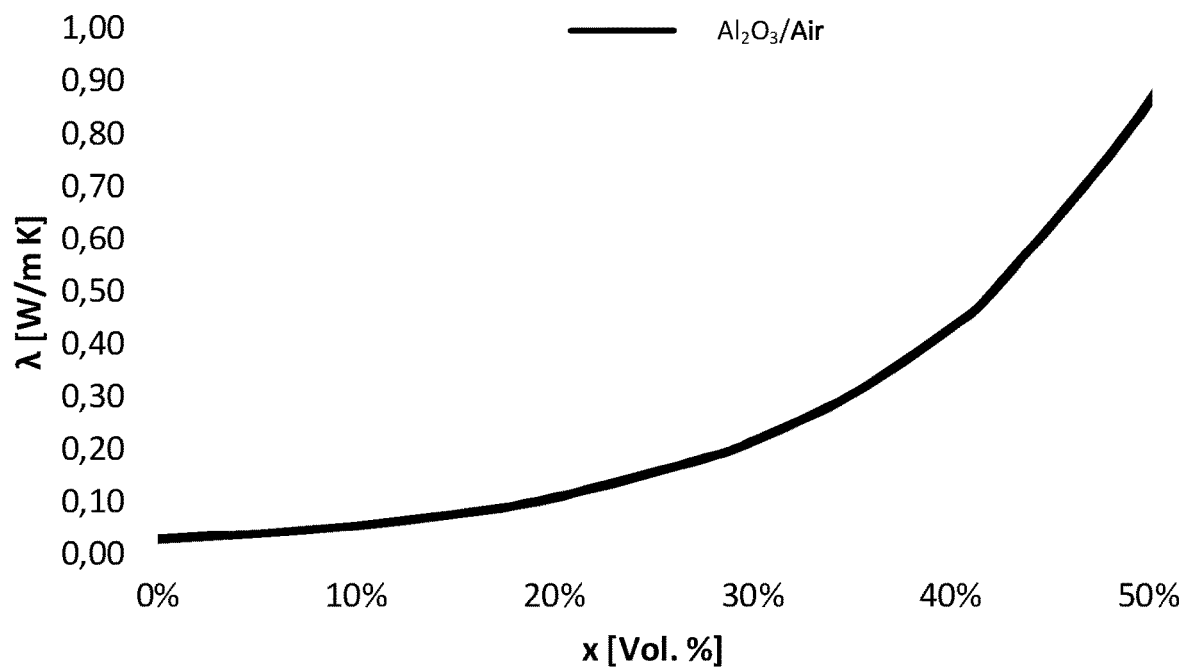
FIG. 3 shows a graph of thermal conductivity of different materials as a function of density.

FIG. 3 shows a schematic graph of the thermal conductivity $\lambda$ of a powdered fill material 6 in the form of an aluminum oxide ($Al_2O_3$) as a function of the solids fraction of the fill in volume percent. The thermal conductivity $\lambda$ of a powder can be ascertained from the thermal conductivities of its components. In such case, taken into consideration are the powder ($\lambda_p$) as well as the medium ($\Delta_m$), in general, air, surrounding the powder, as well as the volume fraction (v) of the surrounding medium (m), according to the formula:

$$\lambda = (\lambda_m)^v (\lambda_p)^{(v-1)}.$$

As evident from the graph in FIG. 3, an increased solids fraction in volume percent, corresponding to an increased density of the fill material 6, provides a significantly improved thermal conductivity $\lambda$.

In state of the art, a sensor head 3 to be encapsulated through the opening O is filled with a fill material 6, as a rule, in the form of a powder. The air, which is located in the internal volume V of the sensor head 3, is, in such case, displaced from the sensor head 3 and flows out counter to the incoming powder 6. The more powder 6 there comes to be in the sensor head 3, the higher is the densification of the individual layers of the powder 6 and the more difficult is the displacement of remaining air inclusions from the internal volume V of the sensor head 3. It is, thus, not possible to exceed a certain solids fraction within the sensor head 3 dependent on the selected powdered fill material 6. This represents a fundamental limiting factor for the maximum possible heat conductivity within the sensor head 3.

A very frequently used fill material is aluminum oxide powder. The density of typical aluminum oxide powder used in the field of thermometer construction lies in the range from 0.9-1.12 kg/dm³, this corresponding to a solids fraction x of, for instance, 28 vol.-%. This leads to a thermal conductivity $\lambda$ of an aluminum oxide powder of, for instance, 0.15-0.18 W/(mK), and is, compared with the thermal conductivity of aluminum oxide in the form of a solid, lower, for instance, by a factor of 150.

If the fill material is now filled under vacuum into the sensor head, then an additional densification can be achieved. This leads to a significant increasing of the thermal conductivity $\lambda$ of the fill material 6 and, associated therewith, to a significantly improved response time of a corresponding thermometer 1. In the case of aluminum-oxide powder, for example, an increase of the solids fraction x from, for instance, 28% to, for instance, 35% can be achieved.

Another advantageous embodiment of the method of the invention includes that the internal volume V of the sensor head 3 is supplementally filled with a gas after the introduction of the fill material 6, for example, by means of the valve 11 of FIG. 2. After the filling of the sensor head 3 under vacuum, the sensor head 3 is, for example, aerated via the valve 11. In an additional method step, then a gas, preferably with a pressure of, for instance, 5 bar, especially preferably with a pressure of at least 10 bar, is filled into the sensor head 3. The gas is one with a high thermal conductivity $\lambda$, especially with a thermal conductivity $\lambda$, which is greater than that of air. Especially preferably, and also for the example shown in FIG. 4, helium is used as the gas. For filling of the sensor head 3 with the gas, the most varied of methods known to those skilled in the art can be used, which all fall within the scope of the present invention. Preferably, the sensor head 3 is closed before the filling of the gas, except for a remaining opening of predeterminable cross sectional area, especially a capillary opening. The remaining opening is, thus, preferably selected as small as possible, in order to minimize escape of the gas upon the closing of the sensor head 3 after the filling of the gas. After the filling of the gas into the sensor head 3, such is completely closed, for example, by means of a welding method.

Figure 4:
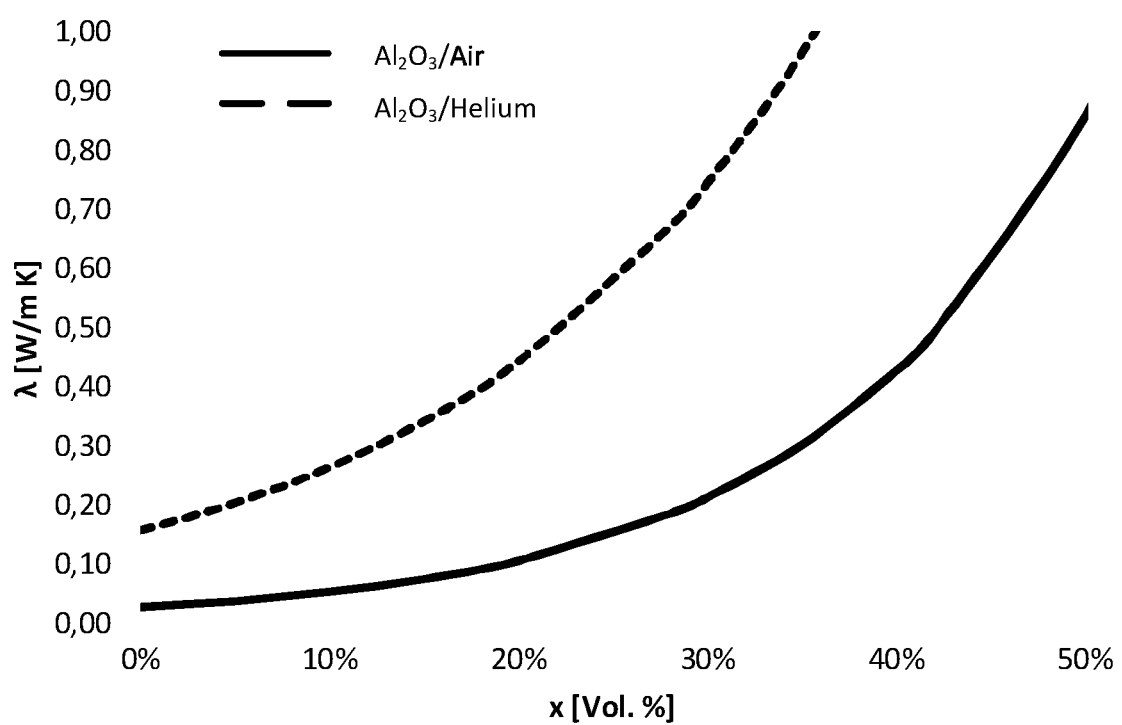
FIG. 4 shows a graph illustrating the additional effect obtained by filling the sensor head with a gas.

The effect of an additional filling of the sensor head 3 with a gas, for example of helium, is shown schematically in FIG. 4. The graph shows for powdered aluminum oxide powder thermal conductivity $\lambda$ as a function of solids fraction x of the powder 6 in the case of a filling with air [solid line] and with added helium [dashed line]. With the filling of helium under positive pressure, air inclusions remaining in the sensor head 3 can be further displaced, this leading to an additional increasing of the thermal conductivity $\lambda$ and, associated therewith, to an additional improvement of the response time of a corresponding thermometer 1. Of course, an additional improvement likewise occurs, when the powdered fill material 6 was earlier filled into the sensor head 3 under vacuum conditions.

LIST OF REFERENCE CHARACTERS

1 thermometer
2 protective tube
3 sensor head
4 electronics unit
5 medium
6 fill material
7 temperature sensor
8 sensor element
9a,9b connection wires
10 T-shaped apparatus
10a,10b,10c end regions of the T-shaped apparatus
11 valve
12 vacuum pump
13a,13b screw thread
14 cap
15a,15b direction of rotation
$\lambda$ thermal conductivity
V internal volume of the sensor head
O opening of the sensor head

The invention claimed is:

1. A method for manufacturing an apparatus for determining and/or monitoring temperature of a medium, comprising method steps as follows:

arranging a sensor element in a sensor head;
producing a vacuum in an internal volume of the sensor head;
heating a first powdered fill material for a predeterminable time interval to a temperature less than a sintering temperature of the first powdered fill material;
introducing the first powdered fill material into at least a portion of the internal volume of the sensor head;
shaking the sensor head at a predeterminable frequency;
filling a gas into the sensor head, wherein the gas has a thermal conductivity greater than 0.05 W/(mK); and
closing the sensor head.

2. The method as claimed in claim 1, wherein the sensor element is a temperature sensor, comprising a temperature sensitive element and at least one connection wire for electrically contacting the element.

3. The method as claimed in claim 1, wherein a vacuum with a pressure of less than $10^{-1}$ mbar is produced.

4. The method as claimed in claim 1, wherein the first fill material is an aluminum oxide, a magnesium oxide, a ceramic potting, carbon nanotubes, boron nitride, aluminum nitride, silicon carbide, or metal.

5. The method as claimed in claim 1, further comprising:
introducing a second fill material into at least a portion of the internal volume of the sensor head.

6. The method as claimed in claim 5, wherein the first and second fill materials are introduced in the form of a mixture into the sensor head.

7. The method as claimed in claim 5, wherein the first and second fill materials are introduced sequentially into the sensor head.

8. The method as claimed in claim 7, wherein a first portion of the internal volume of the sensor head is filled with the first fill material and a second portion of the internal volume of the sensor head is filled with the second fill material.

9. The method as claimed in one of claim 1, wherein the gas is filled into the sensor head with a pressure of at least 5 bar.

10. An apparatus for determining and/or monitoring a process variable of a medium, comprising:
a sensor element; and
a sensor head,
wherein the sensor element and the sensor head are manufactured by:
arranging the sensor element in the sensor head;
producing a vacuum in an internal volume of the sensor head;
heating a first powdered fill material for a predeterminable time interval to a temperature less than a sintering temperature of the first powdered fill material;
introducing the first powdered fill material into at least a portion of the internal volume of the sensor head;
shaking the sensor head at a predeterminable frequency;
filling a gas into the sensor head, wherein the gas has a thermal conductivity greater than 0.05 W/(mK); and
closing the sensor head.

11. The apparatus as claimed in claim 10, wherein the sensor head comprises a sleeve element, especially a cylindrical sleeve element, and a floor element, especially a circular floor element.

* * * * *